US011812734B2

(12) United States Patent
Leach

(10) Patent No.: US 11,812,734 B2
(45) Date of Patent: Nov. 14, 2023

(54) LIVEWELL ASSEMBLY

(71) Applicant: Takin Line Inc., Sarasota, FL (US)

(72) Inventor: Bergen Vance Leach, Sarasota, FL (US)

( * ) Notice: Subject to any disclaimer, the term of this patent is extended or adjusted under 35 U.S.C. 154(b) by 0 days.

(21) Appl. No.: 17/317,764

(22) Filed: May 11, 2021

(65) Prior Publication Data

US 2021/0345588 A1    Nov. 11, 2021

Related U.S. Application Data

(60) Provisional application No. 63/023,143, filed on May 11, 2020.

(51) Int. Cl.
| | |
|---|---|
| *A01K 63/02* | (2006.01) |
| *A01K 97/20* | (2006.01) |
| *A01K 97/05* | (2006.01) |
| *A01K 97/06* | (2006.01) |
| *A01K 97/10* | (2006.01) |

(52) U.S. Cl.
CPC .............. *A01K 97/05* (2013.01); *A01K 97/06* (2013.01); *A01K 97/10* (2013.01); *A01K 97/20* (2013.01); *A01K 63/02* (2013.01)

(58) Field of Classification Search
CPC ........ A01K 97/04; A01K 97/05; A01K 97/06; A01K 97/10
USPC ......... 43/21.2, 54.1, 55, 56, 57; 206/315.11; 224/920, 922
See application file for complete search history.

(56) References Cited

U.S. PATENT DOCUMENTS

| | | | | | |
|---|---|---|---|---|---|
| 3,659,369 | A | * | 5/1972 | Hermanson | A01K 97/10 220/735 |
| 4,768,651 | A | * | 9/1988 | Lanius | A01K 97/06 206/315.11 |
| D299,378 | S | * | 1/1989 | Martin | D22/136 |
| 4,970,982 | A | * | 11/1990 | Martin | B63B 35/14 43/56 |
| 5,172,511 | A | * | 12/1992 | Smith | A01K 97/05 43/56 |
| 5,231,789 | A | * | 8/1993 | Radmanovich | A01K 97/05 43/57 |

(Continued)

OTHER PUBLICATIONS

"Engel Coolers Live Bait Cooler with Net & Four Rod Holders, White, 30Qt.", https://www.amazon.com/Engel-Coolers-Combo-Unit-Holders/dp/B07FYPB6Z8/ref=sr_1_2?dchild=1&keywords=engel live bait cooler&qid=1620251305&sr=8-2.

(Continued)

*Primary Examiner* — Darren W Ark
*Assistant Examiner* — Kevin M Dennis
(74) *Attorney, Agent, or Firm* — Foley & Larnder LLP

(57) ABSTRACT

A livewell assembly includes a main housing, a cover, an aerator, and a utility rail. The main housing includes a top opening and an interior. The interior is accessible via the top opening. The interior is configured to hold a volume of water and live bait. The cover is removably coupled to the main housing and is configured to close the top opening. The aerator is coupled to the main housing and is configured to provide a flow of air to the interior while the cover is coupled to the main housing and closes the top opening. The utility rail is coupled to an exterior of the main housing and is configured to couple an accessory. The utility rail is elongated and comprises a general C-shape cross-section.

9 Claims, 14 Drawing Sheets

(56) References Cited

U.S. PATENT DOCUMENTS

| | | | | |
|---|---|---|---|---|
| 5,305,544 | A * | 4/1994 | Testa, Jr. | A01K 97/05 206/315.11 |
| 5,471,779 | A * | 12/1995 | Downey | A01K 97/22 206/315.11 |
| 5,634,291 | A * | 6/1997 | Pham | A01K 97/05 43/56 |
| 5,822,916 | A * | 10/1998 | Power | A01K 97/05 43/57 |
| 5,941,016 | A * | 8/1999 | Welcher | A01K 97/20 220/323 |
| 5,992,086 | A * | 11/1999 | Cheng | A01K 97/06 43/57 |
| 6,442,888 | B1 * | 9/2002 | Morrow | A01K 63/042 43/57 |
| 6,584,727 | B1 * | 7/2003 | De Shazer | A01K 97/05 43/55 |
| 6,810,617 | B1 * | 11/2004 | Burroughs | A01K 97/20 43/56 |
| 7,017,297 | B1 * | 3/2006 | Ward | A01K 97/22 43/55 |
| 7,024,814 | B1 * | 4/2006 | McDougle | A01K 97/05 210/189 |
| 7,155,859 | B1 * | 1/2007 | Brooks | A01K 97/06 206/315.11 |
| 7,389,608 | B1 * | 6/2008 | MacKay | A01K 97/20 206/315.11 |
| 7,415,794 | B1 * | 8/2008 | Thompson | A01K 97/22 206/315.11 |
| 8,256,156 | B1 * | 9/2012 | Burgoyne, Jr. | A45C 5/065 280/7.14 |
| 8,806,803 | B1 * | 8/2014 | Mitchell | A01K 97/05 206/315.11 |
| 9,220,250 | B1 * | 12/2015 | Davis, Sr. | A01K 97/05 |
| 9,282,797 | B1 * | 3/2016 | Soto | B62B 1/22 |
| 9,345,238 | B1 * | 5/2016 | Higginbotham | A01K 97/05 |
| 9,433,200 | B2 * | 9/2016 | Norman | A01K 97/20 |
| 9,462,796 | B1 * | 10/2016 | Ellis | A47C 7/62 |
| 9,913,464 | B1 * | 3/2018 | Stokes | F16M 13/02 |
| 10,429,116 | B2 * | 10/2019 | Huish | A45C 11/20 |
| 11,377,290 | B2 * | 7/2022 | Morine | B65D 81/113 |
| 11,399,527 | B2 * | 8/2022 | Erdmann | A45F 3/04 |
| 11,414,238 | B2 * | 8/2022 | Ahlström | B65D 25/2841 |
| 2003/0033746 | A1 * | 2/2003 | Johnson | A01K 97/05 43/55 |
| 2005/0086851 | A1 * | 4/2005 | Carden, Jr. | A01K 97/05 43/56 |
| 2006/0112609 | A1 * | 6/2006 | Lee | A01K 97/05 43/57 |
| 2007/0051031 | A1 * | 3/2007 | Allen | A01K 97/05 43/57 |
| 2008/0190011 | A1 * | 8/2008 | Neal | A01K 97/05 43/56 |
| 2012/0151819 | A1 * | 6/2012 | Solis | A01K 97/06 43/54.1 |
| 2016/0120162 | A1 * | 5/2016 | Copper | A45C 11/20 220/592.2 |
| 2017/0223941 | A1 * | 8/2017 | Cornwell | A01K 63/042 |

OTHER PUBLICATIONS

"Fishernomics Collapsible Fishing Bucket Livewell | Large 20 Inch Live Fish and Bait Container with USB Rechargeable Oxygen Pump Aerator", https://www.amazon.com/Fishernomics-Collapsible-Livewell-Container-Rechargeable/dp/B08GXYS7GL.

"Frabill Magnum Bait Station | Aerated Bait Storage for Live Bait | Available in 13 Qt, 19 Qt, & 30 Qt Capacity", https://www.amazon.com/Frabill-Station-Aerated-Available-Capacity/dp/B08DPQY4XK.

"Hobie Livewell Bait Tank V2", https://www.amazon.com/Hobie-Livewell-Bait-Tank-V2/dp/B07D469Y9T/ref=asc_df_B07D469Y9T/?tag=hyprod-20&linkCode=df0&hvadid=312090237498&hvpos=&hvnetw=g&hvrand=4328184297692400979&hvpone=&hvptwo=&hvqmt=&hvdev=c&hvdvcmdl=&hvlocint=&hvlocphy=9018827&hvtargid=pla-569156964200&psc=1.

"Hobie Livewell XL", https://www.hobie.com/parts-and-accessories/items/hobie-livewell-xl,1195/.

"Mr Lion Fishing Bucket, Foldable Fish Bucket, Live Fish Container Multi-Functional Fish Live Lures Bucket Outdoor EVA Fishing Bag for Fishing, Keep The Bait Fresh or Fish Catch Alive", https://www.amazon.com/MR-LION-Foldable-Container-Multi-Functional/dp/B089GJRDRX/ref=asc_df_B089GJRDRX/?tag=hyprod-20&linkCode=df0&hvadid=&hvpos=&hvnetw=g&hvrand=11564919142859123120&hvpone=&hvptwo=&hvqmt=&hvdev=c&hvdvcmdl=&hvlocint=&hvlocphy=9018827&hvtargid=pla-955466686012&psc=1.

"Wilderness Systems Thrive Baitwell for Kayaks, Gray", https://www.amazon.com/Wilderness-Systems-Thrive-Baitwell-Kayaks/dp/B075CMLCXX/ref=asc_df_B075CMLCXX/?tag=hyprod-20&linkCode=df0&hvadid=242000610878&hvpos=&hvnetw=g&hvrand=10518742115536580388&hvpone=&hvptwo=&hvqmt=&hvdev=c&hvdvcmdl=&hvlocint=&hvlocphy=9018827&hvtargid=pla-487188541848&psc=1.

* cited by examiner

SECTION VIEW A-A

LIVEWELL ASSEMBLY

CROSS-REFERENCE TO RELATED PATENT APPLICATIONS

This application claims the benefit of and priority to U.S. Provisional Application No. 63/023,143, filed on May 11, 2020, the entire disclosure of which is incorporated by reference herein.

BACKGROUND

The present disclosure relates generally to the field of livewells for fishing applications. More specifically, the present disclosure relates to portable livewells for fishing applications. Livewells are typically used by fishermen to store live bait while fishing, and may be used from the shore (e.g., a beach, a pier, a dock, etc.), on a watercraft (e.g., a powered or non-powered watercraft, a kayak, a stand-up-paddleboard (SUP), etc., or in any other suitable environment.

SUMMARY

One embodiment relates to a livewell assembly that includes a main housing, a cover, an aerator, and a utility rail. The main housing includes a top opening and an interior. The interior is accessible via the top opening. The interior is configured to hold a volume of water and live bait. The cover is removably coupled to the main housing and is configured to close the top opening. The aerator is coupled to the main housing and is configured to provide a flow of air to the interior while the cover is coupled to the main housing and closes the top opening. The utility rail is coupled to an exterior of the main housing and is configured to couple an accessory. The utility rail is elongated and comprises a general C-shape cross-section.

Another embodiment relates to a livewell assembly that includes a main housing, a cover, and a utility rack. The main housing includes a bottom, a top, and a sidewall. The sidewall extends between the bottom and the top. The top includes a top opening. The main housing includes an interior accessible via the top opening. The bottom surface defines a first plane. The cover is removably coupled to the main housing and is configured to close the top opening. The cover includes a top surface. The top surface of the cover defines a second plane extending in a non-parallel fashion relative to the first plane such that the top opening is tilted toward a front surface of the sidewall. The utility rack is coupled to the front surface of the sidewall. The utility rack includes an extension extending outward from the front surface which includes an aperture configured to receive a portion of at least one tool and a fishing accessory.

Another embodiment relates to a livewell assembly that includes a main housing, a cover, and a utility rack. The main housing includes a bottom, a top, and a sidewall. The sidewall extends between the bottom and the top. A top opening is disposed in the top. The main housing includes an interior that is accessible via the top opening. A bottom surface of the bottom defines a first plane. The cover is removably coupled to the main housing and is configured to close the top opening. A top surface of the cover defines a second plane extending in a non-parallel fashion relative to the first plane such that the top opening is tilted toward a front surface of the sidewall. A bottom surface of the cover includes a cutting surface. The utility rack is coupled to the front surface of the sidewall. The utility rack includes an extension extending outward from the front surface and includes an aperture configured to receive a portion of at least one of a tool and a fishing accessory.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
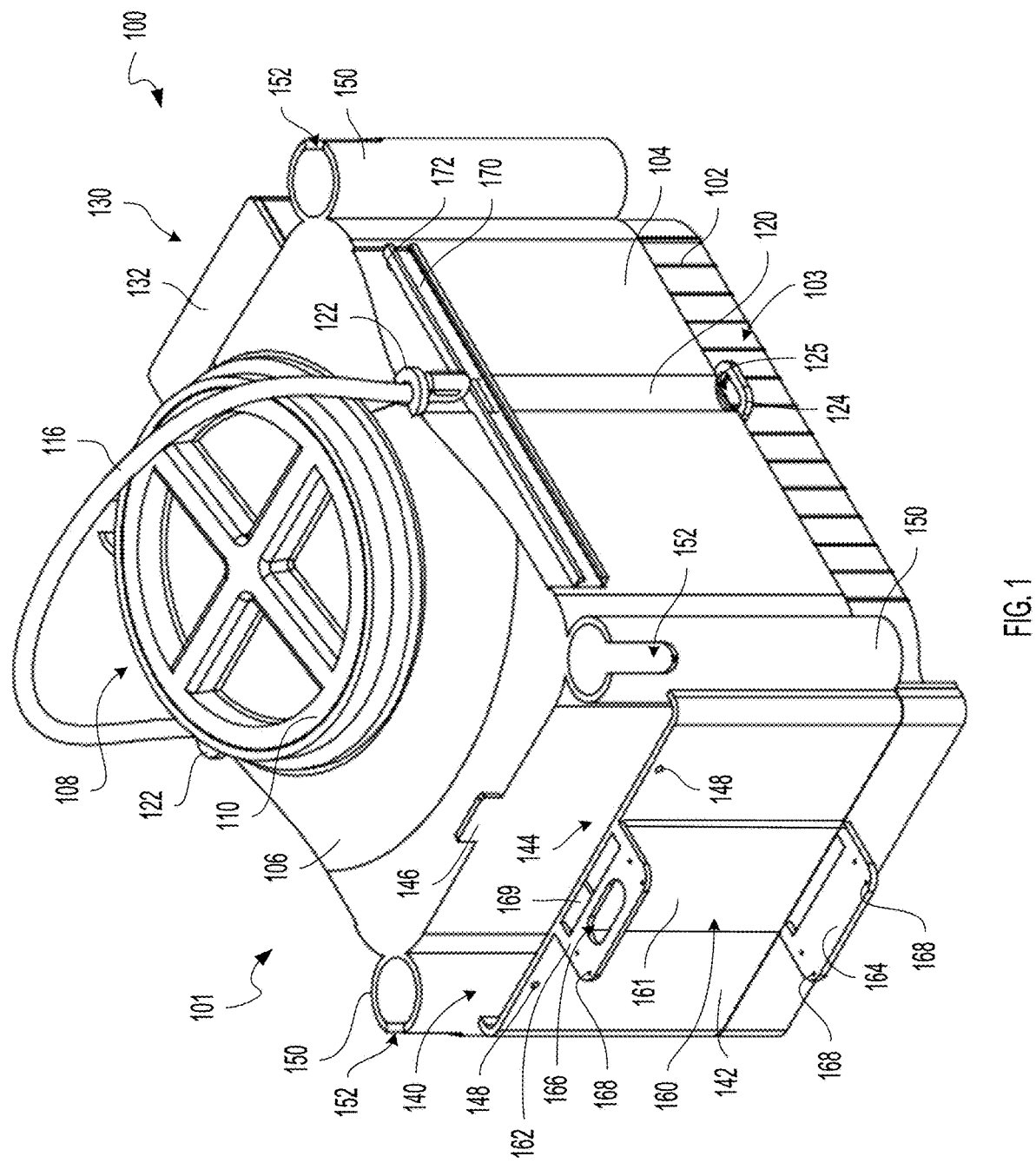
FIG. 1 is a perspective view of a livewell assembly, according to an exemplary embodiment.
Figure 2:
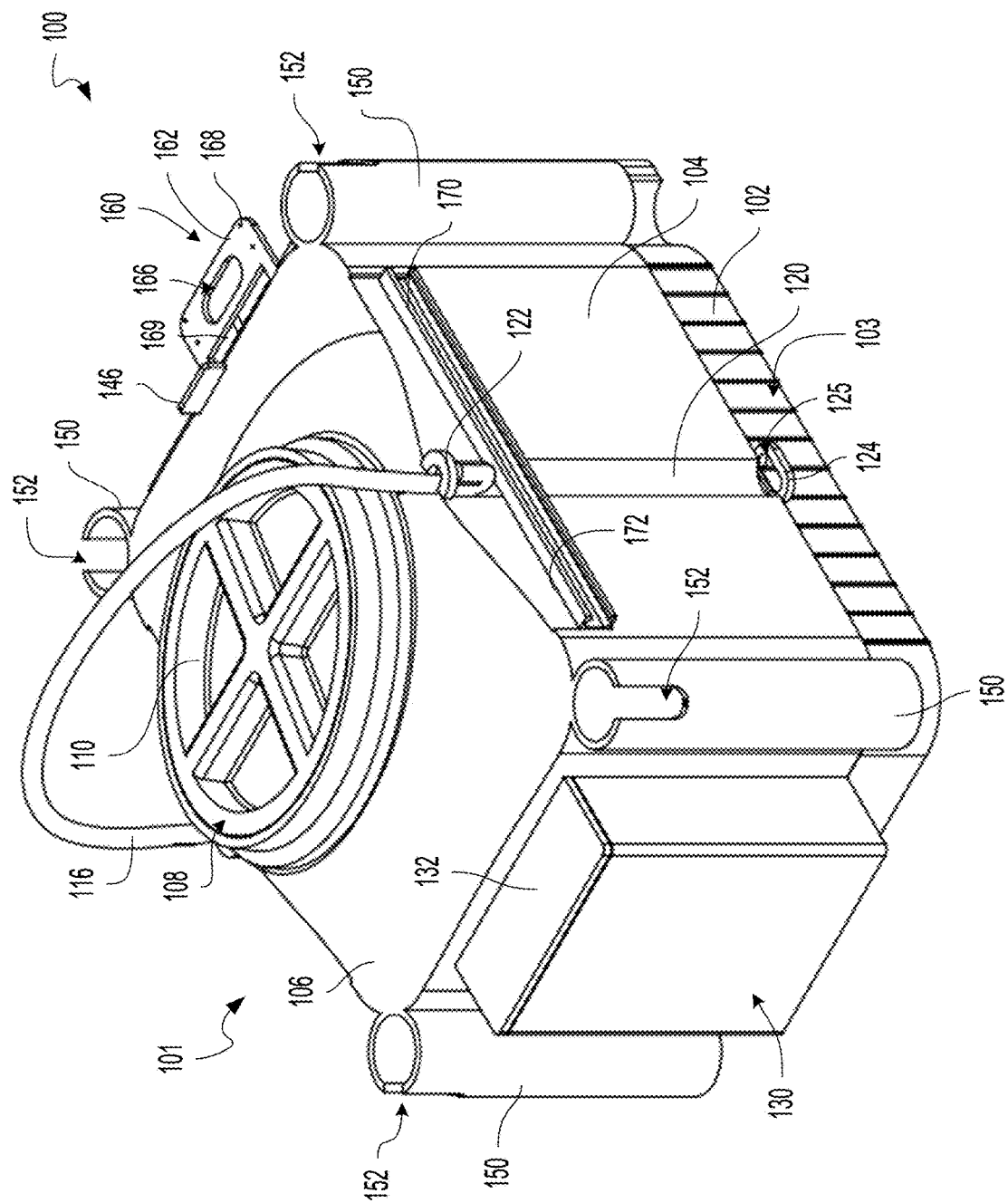
FIG. 2 is another perspective view of the livewell assembly of FIG. 1, according to an exemplary embodiment.
Figure 3:
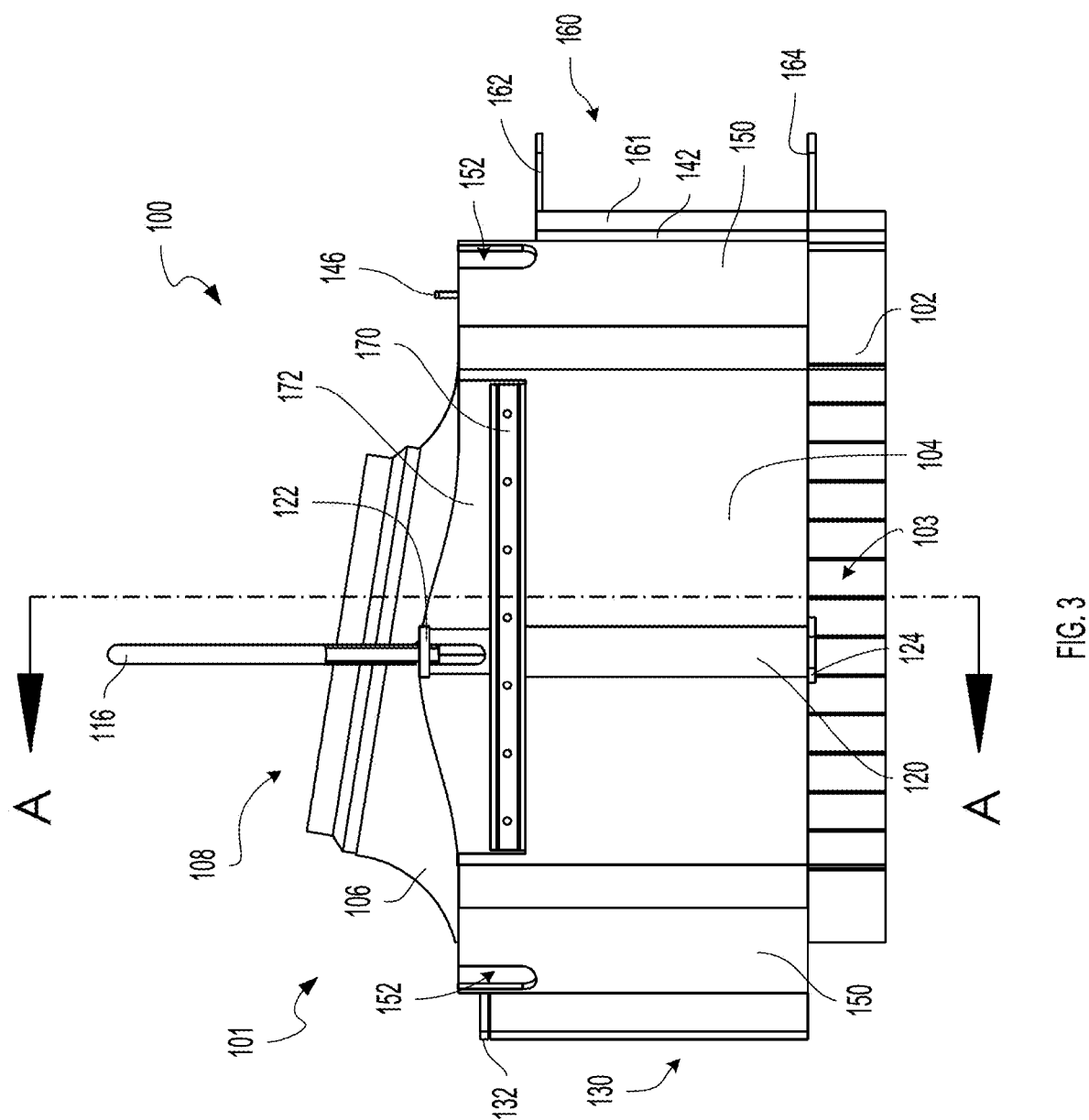
FIG. 3 is a side view of the livewell assembly of FIG. 1 according to an exemplary embodiment.
Figure 4:
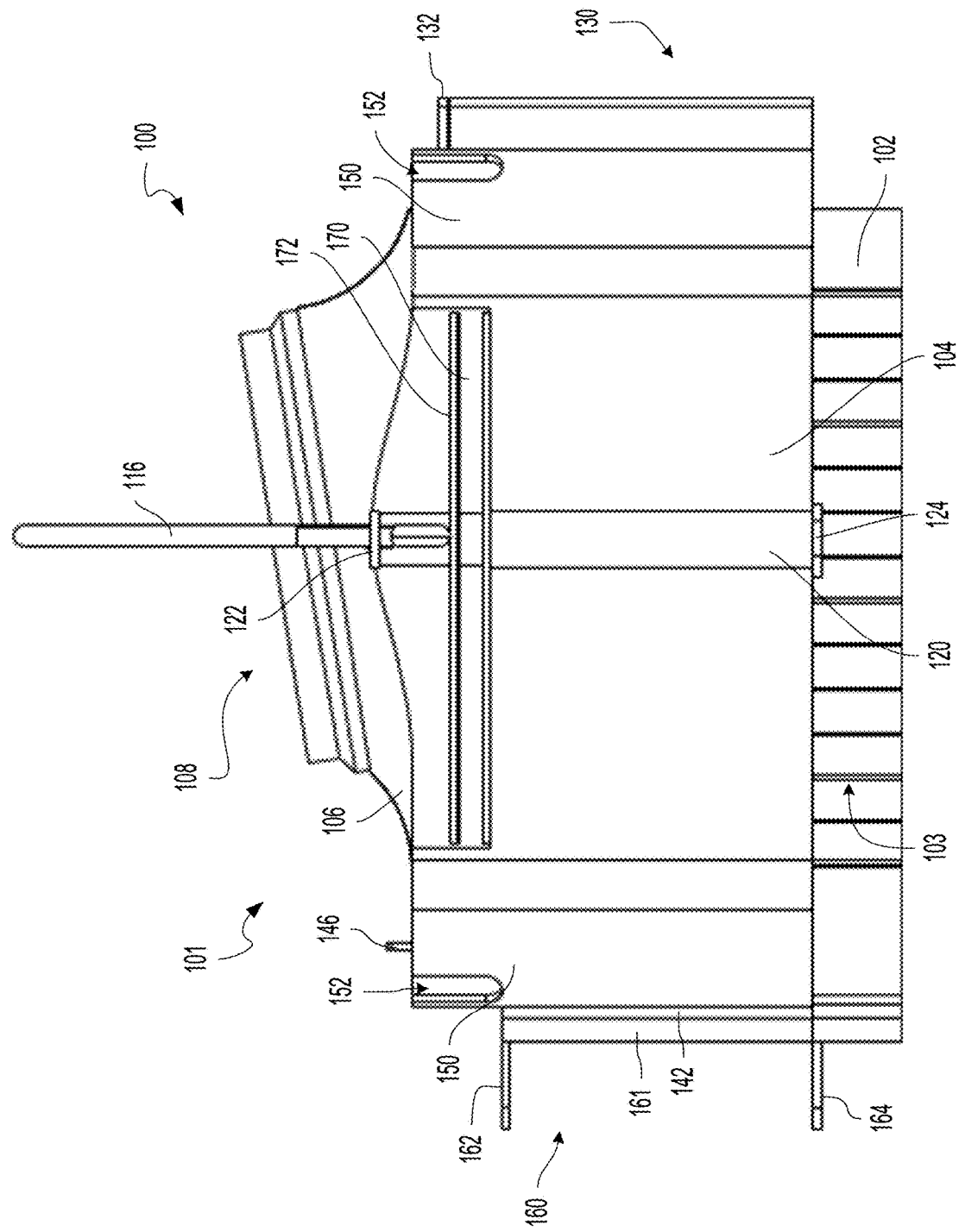
FIG. 4 is another side view of the livewell assembly of FIG. 1, according to an exemplary embodiment.
Figure 5:
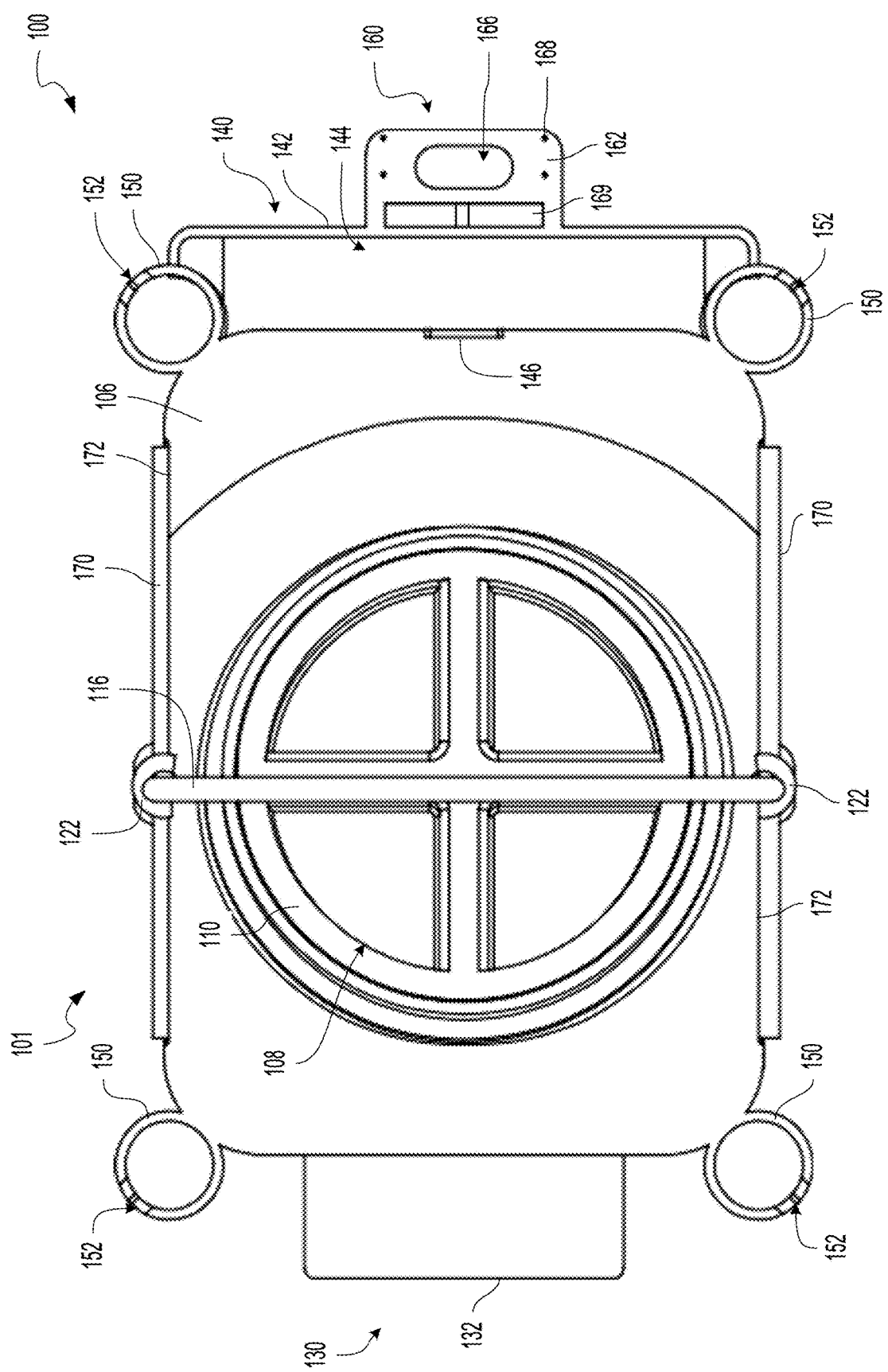
FIG. 5 is a top view of the livewell assembly of FIG. 1, according to an exemplary embodiment.
Figure 6:
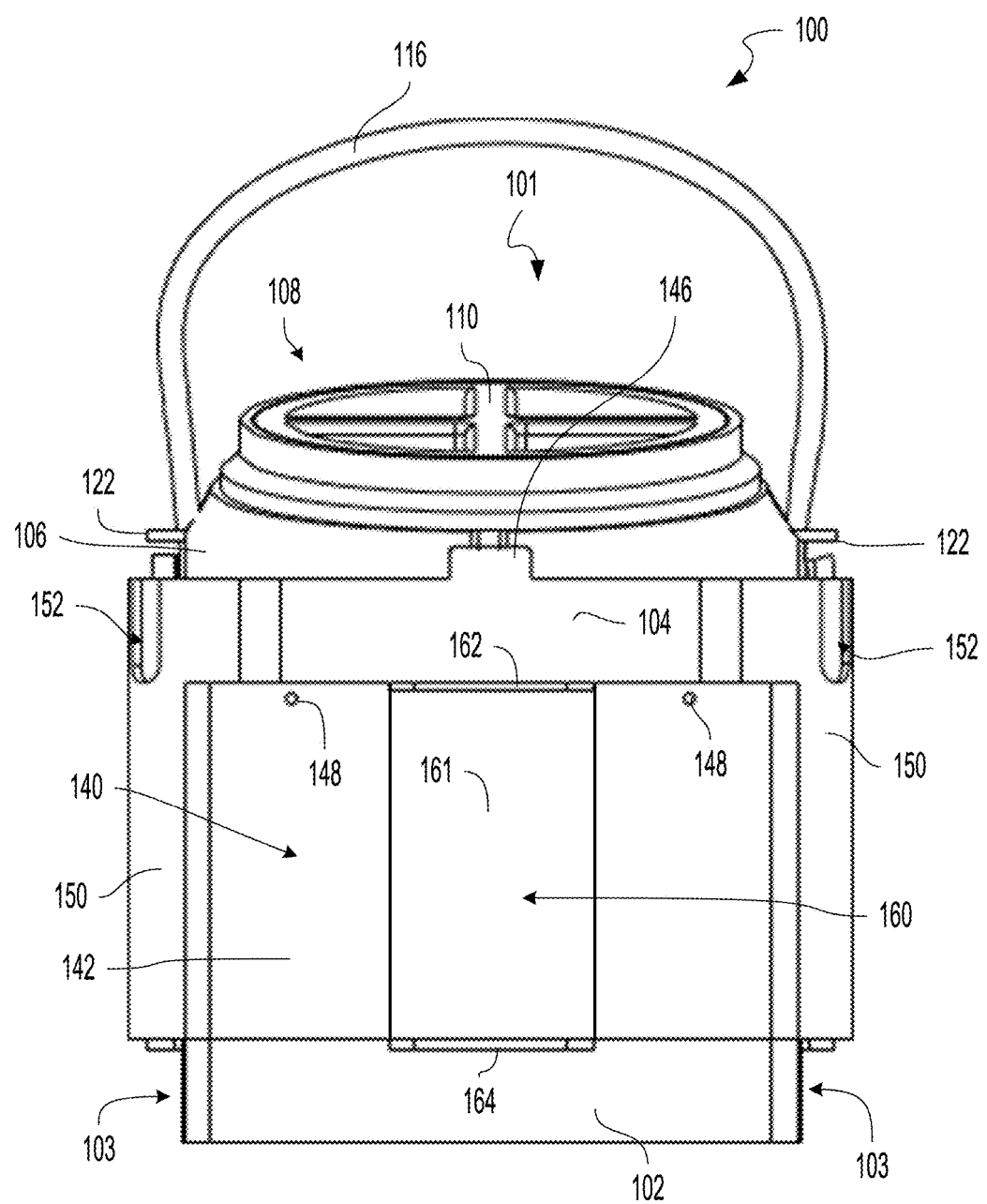
FIG. 6 is a front view of the livewell assembly of FIG. 1, according to an exemplary embodiment.
Figure 7:
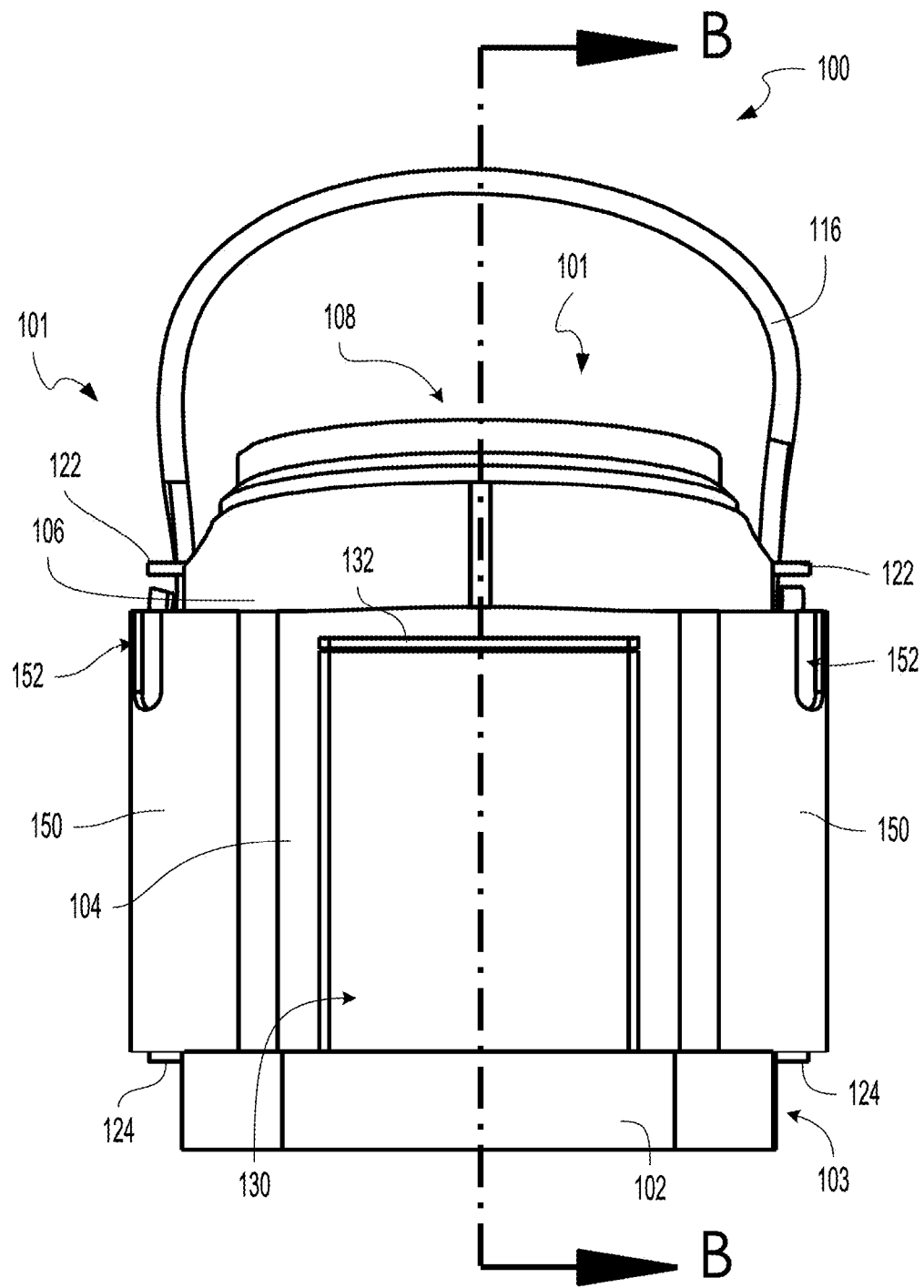
FIG. 7 is a rear view of the livewell assembly of FIG. 1, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According various embodiments disclosed herein, a livewell assembly allows a user to contain aquatic animals (e.g., live bait, fish, etc.) for a prolonged period of time, while also facilitating the transport of necessary fishing gear using an integrated design. The integrated design of the present disclosure may reduce the likelihood of loss or damage to individual devices, and can streamline a user's fishing experience.

Referring to FIGS. 1-10, a livewell assembly 100 (e.g., portable livewell, bait storage assembly, fishing apparatus, etc.) is shown according to one embodiment. Livewell assembly 100 includes a main housing 101 (e.g., a livewell housing, etc.). Livewell housing includes a bottom 102, a wall 104, a top 106, and a lid 110 (e.g., cover, cap, screw-top cap, etc.). As shown in FIGS. 1-10, bottom 102 is sealed or otherwise coupled to wall 104 and top 106. In an exemplary embodiment, the interfaces between bottom 102, wall 104, and top 106 are substantially rounded or chamfered. In an exemplary embodiment, bottom 102, wall 104, and top 106 are sealed and define an internal volume 118.

In some embodiments, bottom 102 includes markings 103 (e.g., printed marks, engravings, embossing, debossing, etc.) that facilitate determining a measurement of an object, such as a fish. For example, marks 103 may have indications of equidistant spacing (e.g., 1-inch, 1-foot, 1-centimeter, 1-millimeter, etc.) which allow a user obtain a measurement by comparing an object to the marks 103 (e.g., a measurement of the length of a fish). In some embodiments, marks 103 may be applied to a suitable exterior location on the livewell assembly 100 using at least one adhesive label (e.g., sticker), painting, engraving, embossing, or debossing. In an exemplary embodiment, marks 103 are integrally formed with bottom 102 and are raised from the surrounding substantially flat surface (see, e.g., FIGS. 1-4). As shown in FIGS. 1-4, marks 103 are located on a side of bottom 102 that is substantially vertical and planar. In such an embodiment, an object may be placed (e.g., laid, held by a user, etc.) nearby marks 103 on a side of the livewell assembly 100 to obtain a measurement by comparing the object to marks 103.

Figure 8:
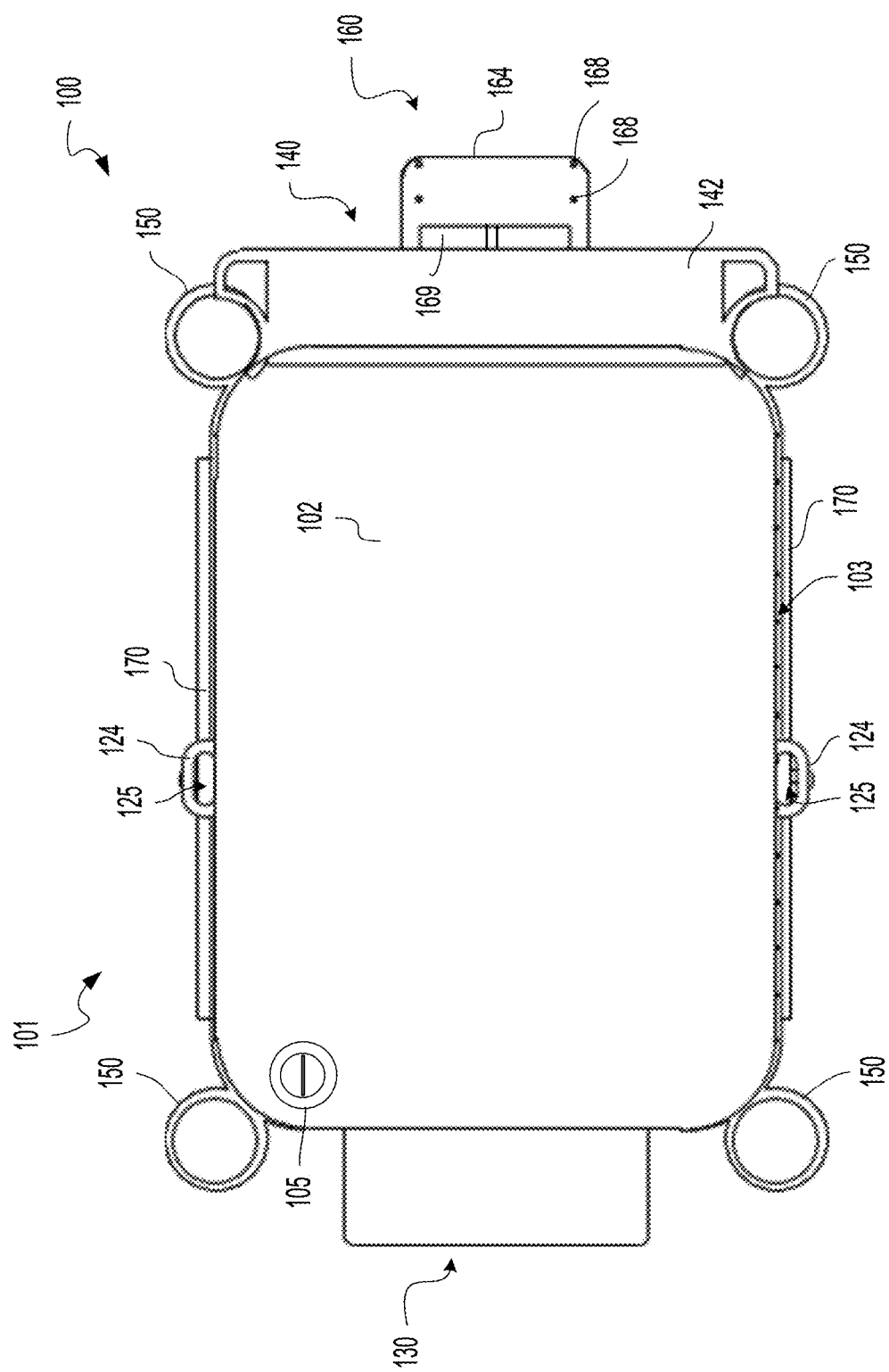
FIG. 8 is a bottom view of the livewell assembly of FIG. 1, according to an exemplary embodiment.

Bottom 102 includes a drain 105 (see, e.g., FIG. 8). In some embodiments, bottom 102 includes a plurality of drains 105. Drain 105 is configured to allow a user to selectively drain liquid from the internal volume 118. Drain 105 may include at least one of a valve, threaded cap, screw top cap, stopper, or another suitable flow regulating mechanism that allows the user to selectively drain fluid from the internal volume 118. For example, drain 105 may be located on bottom 102 and include a valve that a user can open to partially or fully drain the internal volume 118.

As shown in FIGS. 1-10, top 106 includes an opening (e.g., mouth, aperture, hole, etc.), shown as aperture 108, that is configured to receive lid 110. Lid 110 is configured to seal and enclose internal volume 118. In one embodiment, aperture 108 and lid 110 are substantially circular. In other embodiments, aperture 108 and lid 110 are non-circular (e.g., square, rectangular, etc.). In some embodiments, lid 110 is tethered (e.g., tied, hitched, fastened, etc.) to top 106 to prevent the loss of lid 110 when lid 110 is disengaged from aperture 108. Aperture 108 is angled relative to bottom 102 and has a size (e.g. opening area, void area, etc.) that accommodates access to the internal volume 118 by at least one of a user's hand and/or arm. In an exemplary embodiment, aperture 108 is sized to accommodate a user, or a pair of users, reaching into the internal volume 118 with one or more appendages (e.g., hands, arms, etc.). For example, aperture 108 may have a diameter that is more than twice the diameter of an average user's arm. In some embodiments, the aperture 108 is larger than three times the diameter of a user's arm to facilitate movement of the users arm within the internal volume 118. In such embodiment, the size of the aperture may facilitate visual inspection of the contents of the internal volume 118 while the user has one or more hands inserted into the internal volume 118. Furthermore, in such embodiment, the angled aperture 108 may allow for additional mobility of the user's arm while the user's arm is inserted in the internal volume 118. For example, aperture 108 may be angled toward a front of livewell assembly 100 to facilitate access by a user positioned facing the front of livewell assembly 100, and providing increased access relative to an otherwise flat (non-angled) aperture 108.

As shown in the exemplary embodiment of FIGS. 1-10, aperture 108 is angularly offset (e.g., angled, slanted, etc.) relative to bottom 102. In an exemplary embodiment, the angular offset of aperture 108 reduces the heat and light flux through the aperture 108 by reducing the effective area of the aperture 108 relative to a primary emitter (e.g., the sun). According to an exemplary embodiment, a reduced amount of direct radiation (e.g., sunlight exposure) to the internal volume 118 can advantageously prolong the quality and duration of aquatic life contained in the internal volume 118. By way of a counterexample, exposure to direct sunlight may worsen or intensify stress factors (e.g., excessive heat, loss of vision, sensory deprivation, abnormal habitat, etc.) which may cause aquatic life to expire prematurely (e.g., expire before a time desired by the user). Furthermore, in some embodiments, aperture 108 is offset from the base of the top 106 to prevent and deter aquatic life from departing the internal volume 118 on its own volition. Additionally, in some embodiments, the angle of aperture 108 improves water retention by facilitating return of water droplets formed by condensation of evaporated water on the internal hydrophobic surfaces of the top 106 and lid 110 to the bulk of the liquid (e.g., salt water, fresh water, aquatic life supporting medium, etc.) by promoting the rolling-off of droplets in the angled and downward sloping direction of the angled aperture 108. Furthermore, as discussed above, the angular offset facilitates access to live bait by users positioned in front of the livewell assembly 100.

Figure 9:
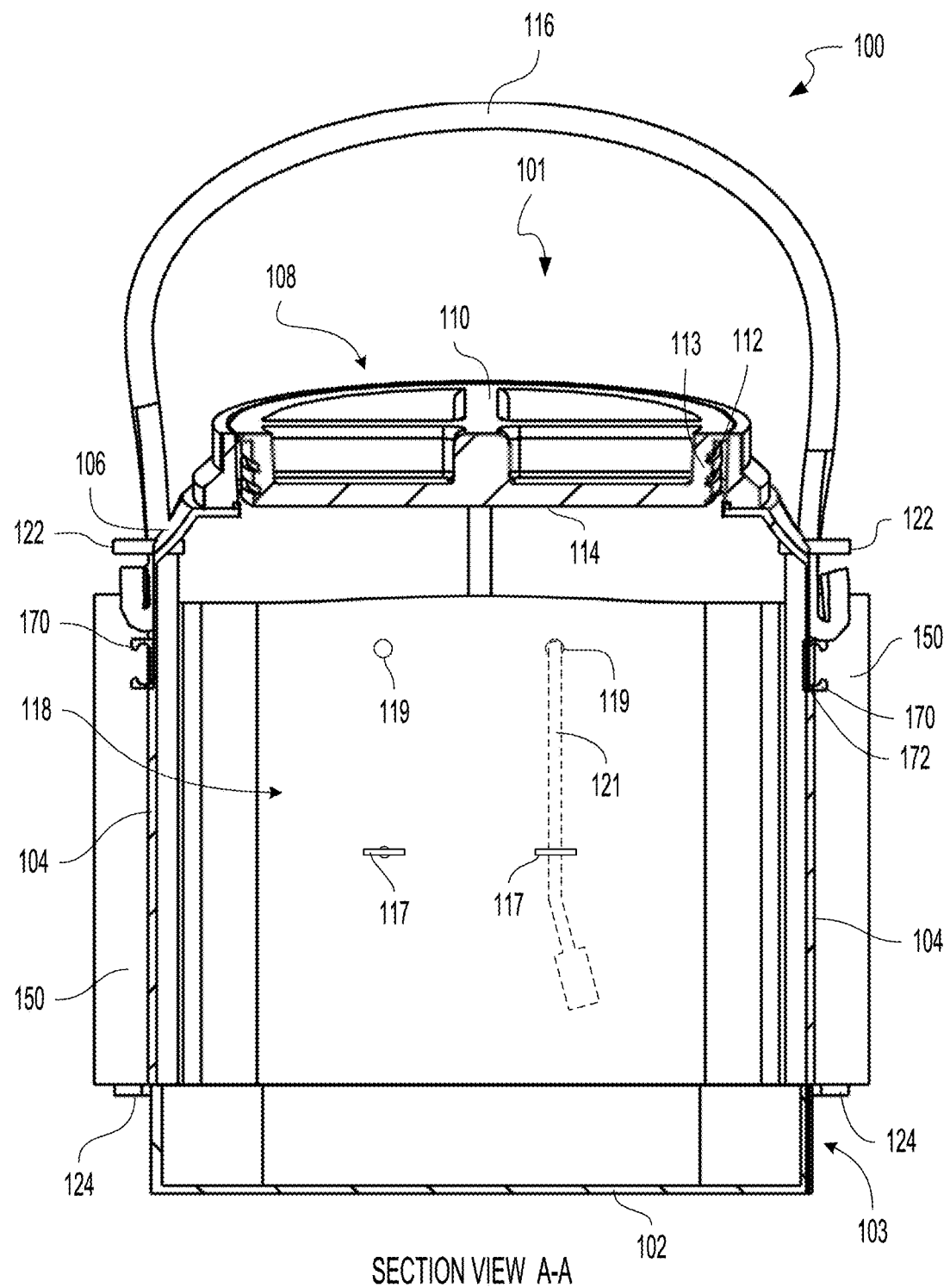
FIG. 9 is a sectional view of the livewell assembly of FIG. 1 taken along line A-A of FIG. 3, according to an exemplary embodiment.
Figure 10:
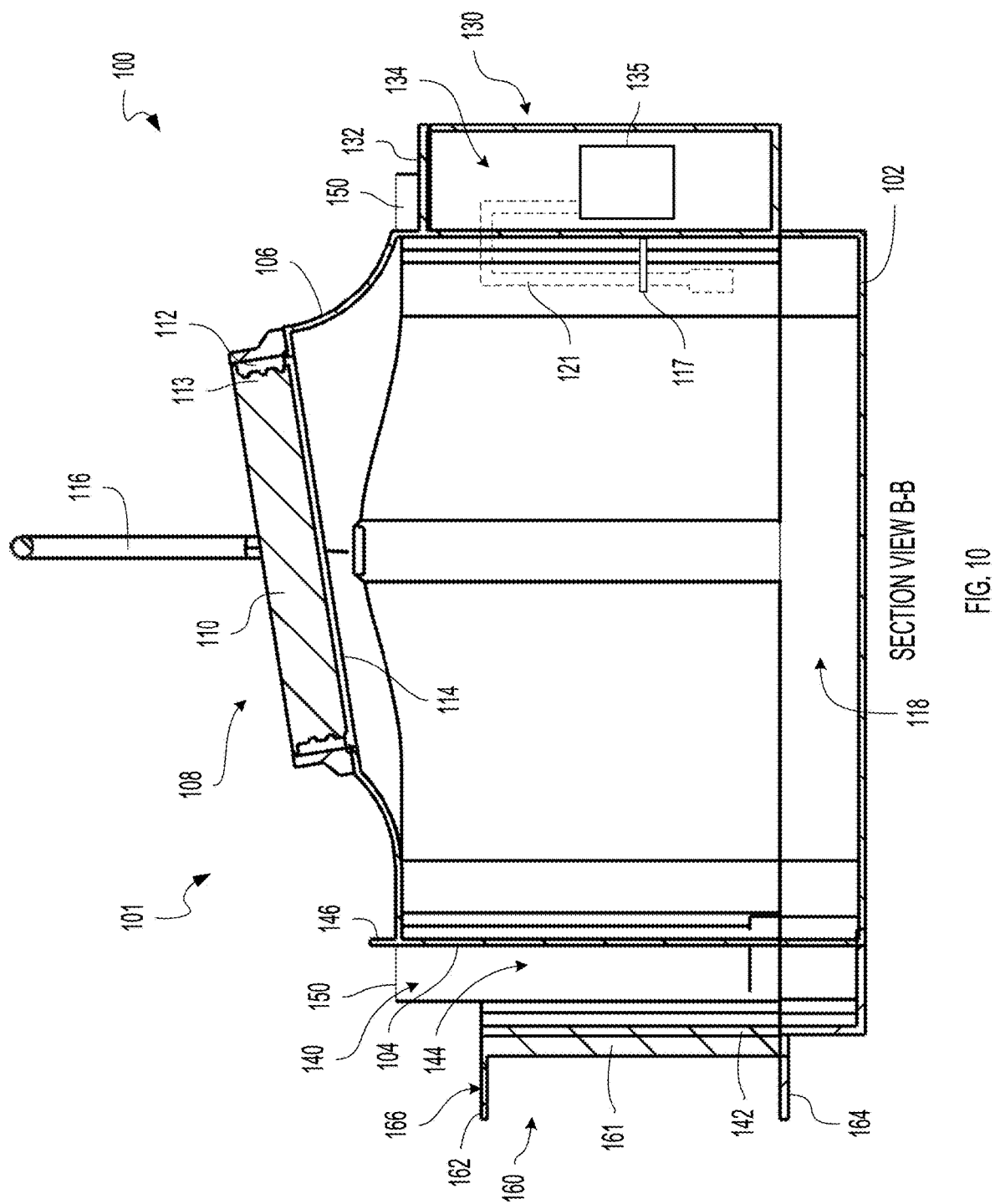
FIG. 10 is a sectional view of the livewell assembly of FIG. 1 taken along line B-B of FIG. 7, according to an exemplary embodiment.
Figure 12:
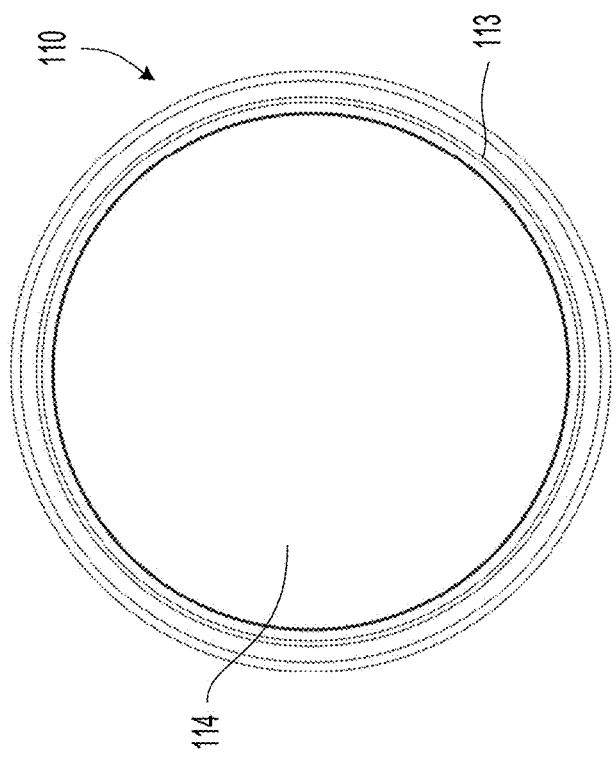
FIG. 12 is a bottom view of the lid of FIG. 11, according to an exemplary embodiment.
Figure 13:
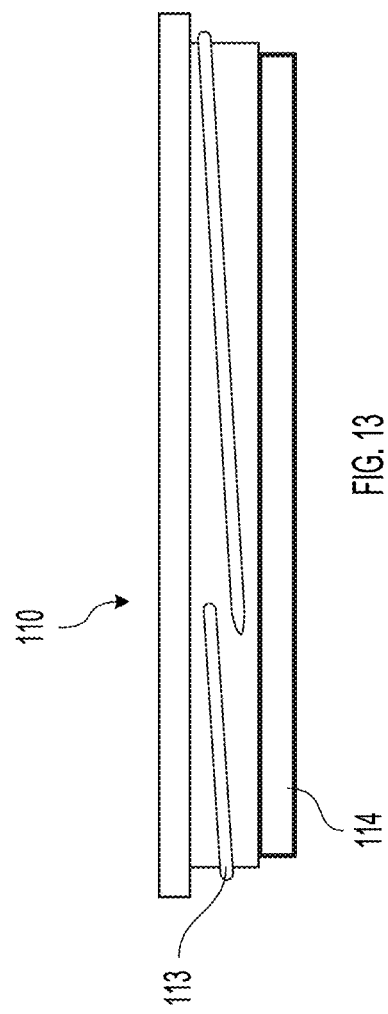
FIG. 13 is a side view of the lid of FIG. 11, according to an exemplary embodiment.
Figure 11:
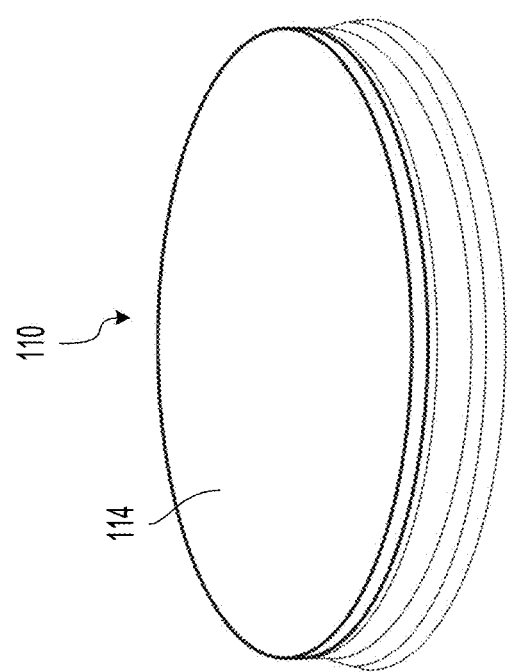
FIG. 11 is a perspective view of a lid usable with the livewell assembly of FIG. 1, according to an exemplary embodiment.

As shown in FIGS. 9 and 10, aperture 108 may include threading 112 that corresponds to threading 113 on the periphery of lid 110 (see also, FIGS. 12 and 13). In some embodiments, threading 112 is on a surface of aperture 108 which corresponds to threading 113 on a surface of lid 110. In some embodiments, the interface between aperture 108 and lid 110 includes a sealing device (e.g., gasket, O-ring, etc.) and threading. In still other embodiments, lid 110 and/or aperture 108 does not include threading. In some embodiments, lid 110 seals aperture 108 using a snap-fit (e.g., snap top) configuration. In some embodiments, lid 110 includes a taper (see, e.g., FIGS. 11 and 12) and facilitates sealing lid 110 by wedging.

As shown in FIGS. 9-13, lid 110 includes a cutting surface 114 (e.g., butcher block, cutting board, etc.). In some embodiments, lid 110 is made from a durable and hydrophobic material (e.g., polymer, plastic, etc.). In some examples, lid 110 may include secondary materials that facilitate cutting on the cutting surface 114 without significantly damaging lid 110 or the cutting device. For example, lid 110 may be made from high-density polyethylene. In such example, the cutting surface 114 may show signs of wear (e.g., cosmetic damage, scratches, nicks, marks, marring, etc.) after repeated cutting operations, but the material will resist failure (e.g. puncture, tearing, cracking, gouging, etc.) due to the material properties of high-density polyethylene. In some embodiments, lid 110 and cutting surface 114 are made of high-density polyethylene. In other embodiments, cutting surface 114 may be made from high-density polyethylene and lid 110 may be from a different suitable material (e.g., a thermoset plastic, wood, low-density polyethylene, metal, etc.). In such example, the cutting surface 114 may be coupled (e.g., fixedly coupled, fastened, secured, adhered, etc.) to lid 110. In some embodiments, the cutting surface 114 is selectively removable from the lid 110, and cutting surface 114 may be removed from lid 110 for cleaning and periodic replacement of the cutting surface 114 material, at the discretion of the user. Cutting surface 114 may in one embodiment cover substantially all of the underside of lid 110, include a generally planar surface covering substantially all of the underside of lid 110, and provide a surface that facilitates using one or more knives for cutting (e.g., cutting bait, cutting caught fish, etc.)

As shown in FIGS. 1-7, 9-10, livewell assembly 100 includes a handle 116. Handle 116 is made of a pliable material (e.g., rope, wire, cloth, mesh, leather, nylon, braided nylon, etc.). In some embodiments, handle 116 includes a rigid or reinforced portion or section at an approximate midpoint that us usable for gripping by a user. In other embodiments the entirety of the handle 116 is a pliable material. The thickness and shape of the handle 116 may vary between the ends of the handle 116. In an exemplary embodiment, the handle 116 is padded. In some embodiments, handle 116 has an adjustable length to facilitate different carrying styles (e.g., over the shoulder, cross body, by hand, etc.). In some embodiments, the livewell assembly 100 includes a plurality of handles 116 (e.g., 2, 3, or more). The handle 116 may be fixedly or removably coupled to the livewell assembly 100.

As shown in FIGS. 1-10, wall 104 includes a channel 120. Channel 120 extends generally vertically along a side of livewell assembly 100. In one embodiment, an upper portion of channel 120 includes a handle coupler, shown as handle mount 122, and a lower portion of channel 120 includes a securing point (e.g. pad eye, tie-down mount, tie down bracket, mount, etc.), shown as mount 124. In some embodiments, handle mount 122 is configured to releasably secure handle 116. In some embodiments, handle 116 is removable from the livewell assembly to facilitate replacement or maintenance (e.g., washing) of handle 116. For example, handle 116 may be releasably secured to handle mount 122 by at least one of a bolting, clipping, latching, hooking, snap fitting, snap fit buckling, screwing, threading, or other suitable releasable fastening method. As shown in FIGS. 1-7, 9, and 10, handle 116 is hooked to handle mount 122. In some embodiments, one end of handle 116 is fixedly coupled (e.g., stapled, glued, bonded, welded, nailed, riveted, etc.) to handle mount 122. In other embodiments, both ends of handle 116 are fixedly coupled to handle mounts 122.

As shown in FIGS. 1-10, mount 124 is substantially perpendicular to wall 104 and parallel to bottom 102. Mount 124 includes an elongated slot 125. In some embodiments, mount 124 may be substantially perpendicular to both wall 104 and bottom 102. Mount 124 is integrally formed with wall 104. In other embodiments, mount 124 is formed separately and is coupled (e.g., fixedly coupled, mounted, welded, bonded, glued, fastened, etc.) to wall 104. In some embodiments, mount 124 is at least one of a hook, latch, pad eye, tie-down bracket, d-ring bracket, and/or other suitable mounting hardware. Mount 124 is configured to receive a strap, cord, and/or rope that secures the livewell assembly 100 to a surface or device (e.g., a wagon, a cart, a handcart, a pushcart, a paddle board, a kayak, a pier, a dock, a boat, etc.). Mount 124 may be generally rectangular in shape and have a central aperture to facilitate utilizing additional securing accessories (e.g., straps, ropes, hooks, etc.).

As shown in FIG. 1-5, livewell assembly 100 includes an exterior enclosure or container, shown as container 130 (e.g., a secondary housing). Container 130 is positioned on an exterior portion of wall 104 and includes a cover 132 which encloses a storage space (e.g., enclosed space) shown as storage volume 134 (see, e.g., FIG. 10). In some embodiments, container 130 is configured to be water tight, or substantially water tight (e.g., splash and water-resistant), when the container cover 132 is in a closed positon or orientation. In some embodiments, cover 132 is hinged and configured to selectively seal and enclose storage volume 134. In some embodiments, cover 132 is hinged and pivotably coupled to a remainder of container 130. Container 130 is configured to contain a variety of objects (e.g., aerators, fishing tackle, cell-phones, keys, sunglasses, etc.). In an exemplary embodiment, container 130 is configured to secure and enclose at least one aerator 135 (see, e.g., FIG. 10). In various alternative embodiments, container 130 is or includes a dry-box.

As shown in FIG. 10, aerator 135 is positioned and configured to aerate internal volume 118. In some embodiments, aerator 135 includes an aerator tube 121 that passes from the container volume 134, through aerator apertures 119 in wall 104 (see, e.g., FIG. 9), into the internal volume 118. Aerator apertures 119 are sealed around a corresponding aerator tube 121. Aerator tubes 121 are further secured within the internal volume 118 by aerator tube holders 117 (e.g., hooks, loops, eyelets, screw eyes, grooves, snap fit fasteners, pad eyes, etc.). Aerator tube holders 117 may be positioned on the internal surface of the wall 104 or bottom 102 such that the secured aerator tube is positioned to aerate internal volume 118. For example, the aerator tube holders 117 may be configured and positioned to secure the terminal end of the aerator tube in a submerged position within a liquid (e.g., saltwater, freshwater, etc.) contained in internal volume 118, and may additionally prevent the aerator tubes from floating on the surface of the liquid.

Aerator 135 may be powered by an internal battery (e.g., self-contained) or an external battery. In an exemplary embodiment, aerator 135 is replaceable and removable from the container 130. In some embodiments, the container 130 is partially or fully sealed and includes a valve or selectively openable opening to allow air into the container. The valve or opening of the container 130 is shielded and configured to prevent liquid or debris from entering the container 130 while in an open position and allowing air to enter container 130. For example, the valve or opening may include a curved channel that prevents streams of liquid (e.g., splashes, sprays, etc.) from entering the container 130 while still allowing air into container 130. In an exemplary embodiment, livewell assembly 100 includes a plurality of aerators 135. In some embodiments, livewell assembly 100 includes a plurality of containers 130. In an exemplary embodiment, container 130 is configured to secure and enclose two aerators 135. In some embodiments, container 130 is configured to be splash and water resistant, but includes vent holes configured to enable air venting of storage volume 134. In this way, electronic or other devices may operate within storage volume 134 and be protected from undesirable exterior elements (e.g., saltwater, etc.) yet not overheat from being in an enclosed space.

As shown in FIGS. 1, 5, 6, 8, and 10, the livewell assembly 100 includes an exterior compartment, shown as compartment 140 (e.g., a cavity, a storage space, etc.). In an exemplary embodiment, compartment 140 includes a compartment wall 142, and defines a volume between compartment wall 142 and wall 104, shown as compartment volume 144. In an exemplary embodiment, the compartment volume 144 may be sized to receive and secure a box (e.g., a tackle box, tackle organizer, dry box, etc.). In some embodiments, the compartment wall 142 may include securing holes 148.

In an exemplary embodiment, securing holes 148 may be configured to receive hooked ends of an elastic band (e.g., a bungee cord, etc.). In such embodiment, a tab 146 may be configured to secure a section of an elastic band to create tension in the band between securing holes 148 and tab 146. In some embodiments, the tension in the band may secure an object stored in compartment 140 (e.g., a tackle box). In other embodiments, tab 146 may be configured to prevent items placed on top 106 from inadvertently falling into compartment 140. As shown in the exemplary embodiment of FIG. 8, compartment wall 142 extends underneath the compartment volume 144 to wall 104.

As shown in FIGS. 1-10, the livewell assembly 100 includes a plurality of rod holders 150. In some embodiments, rod holders 150 are substantially cylindrical and hollow, and are configured to receive the handle end of a fishing rod. In an exemplary embodiment, the size, length, orientation, and position of the rod holder 150 on the livewell assembly 100 prevents the terminal end of a fishing rod handle from extending beyond the bottom 102. In some embodiments, rod holder 150 is capped (e.g., closed) at an end near bottom 102 to prevent a fishing rod handle from contacting the ground. As shown in FIG. 1, rod holders 150 include a slot (e.g., notch, channel, cutout, groove, etc.), shown as slot 152, that is configured to receive a protruding feature of a fishing rod. For example, rod holder 150 rotatably secures a fishing rod when slot 152 engages the body of a fishing reel, or a protruding feature of a fishing rod handle.

In some embodiments, rod holders 150 are integrally formed (e.g., molded, casted, formed, injection molded, etc.) with wall 104. In some embodiments, rod holders 150 are formed separately and are fastened (e.g., mounted, secured, glued, fixed, bonded, etc.) to wall 104. In an exemplary embodiment, rod holders 150 are integrally formed with the wall 104 in an injection molding process. In some embodiments, one or more rod holders 150 may be configured to receive a rod tube (e.g., fly rod tube, spinning rod tube, travel tube, tube case, rod travel case, etc.). In some embodiments, livewell assembly 100 includes one or more rod holders 150. In an exemplary embodiment, rod holders 150 are positioned in a substantially vertical orientation. In one embodiment, first and second rod holders 150 are provided at opposite sides of compartment volume 144 and at a front of livewell assembly 100 to facilitate a user being able to access top opening 108, equipment stored within compartment volume 144, and rod holders 150 from the front side of livewell assembly 100 (e.g., in the case where a user is positioned facing the front of livewell assembly 100).

As shown in FIGS. 1-6, 8, and 10, the livewell assembly 100 includes a tool holder (e.g., holder, tool mount, etc.), shown as utility holder 160. Utility holder 160 includes a top plate 162 and a bottom plate 164 that are offset from each other and extend perpendicularly from base 161. In an exemplary embodiment, top plate 162 and bottom plate 164 are substantially perpendicular to compartment wall 142 and parallel to bottom 102. Top plate 162 includes a tool hole 166 (e.g., slotted hole, square hole, rectangular hole, elliptical hole, etc.) that is configured to releasably secure and receive the utility end of a closed pliers, knife, pen, marker, or other tool or implement. In some embodiments, the top plate 162 and/or the bottom plate 164 include a plurality of through-holes 168 that are configured to secure a fishhook or other hooked implement to the respective plate. Base 161 includes a partitioned vertical slot 169 that is configured to releasably secure a slender and elongated implement (e.g., a knife, scissor, pen, etc.). As shown in FIGS. 1-6, 8, and 10, utility holder 160 is integrally formed with compartment wall 142. In other embodiments, utility holder 160 is formed separately and is fixedly coupled to wall 104.

In one embodiment, the livewell assembly 100 includes mounting rails, shown as utility rails 170. Utility rails are coupled to an exterior surface of wall 104. In another exemplary embodiment, the rails are partially recessed into the wall 104 into recess 172 to improve the repeatability and accuracy of attaching the rails 170 to wall 104 during assembly of livewell assembly 100. As shown in FIG. 1, utility rails 170 have a C-shape. In other embodiments, utility rails 170 may be in other configurations such as a dovetail configuration, a top hat rail, or other suitable mounting rail configurations. In some embodiments, utility rails 170 are configured to releasably secure at least one accessory to livewell assembly 100. In an exemplary embodiment, the accessory is at least one of a cup holder attachment, a bottle opener attachment, a fishing rod holder attachment, a tool holster attachment, a tackle box attachment, a dry box attachment, a fishing line holder attachment, a magnetic mount attachment, a battery attachment, a phone charger attachment, a solar panel attachment, a light attachment, or a towel rack attachment, and/or still another suitable attachment. In some embodiments, the utility rails 170 are magnetic and can secure magnetized objects (e.g., magnetized fish hooks, magnetized pliers, magnetized knives, etc.) to the livewell assembly 100.

Figure 14:
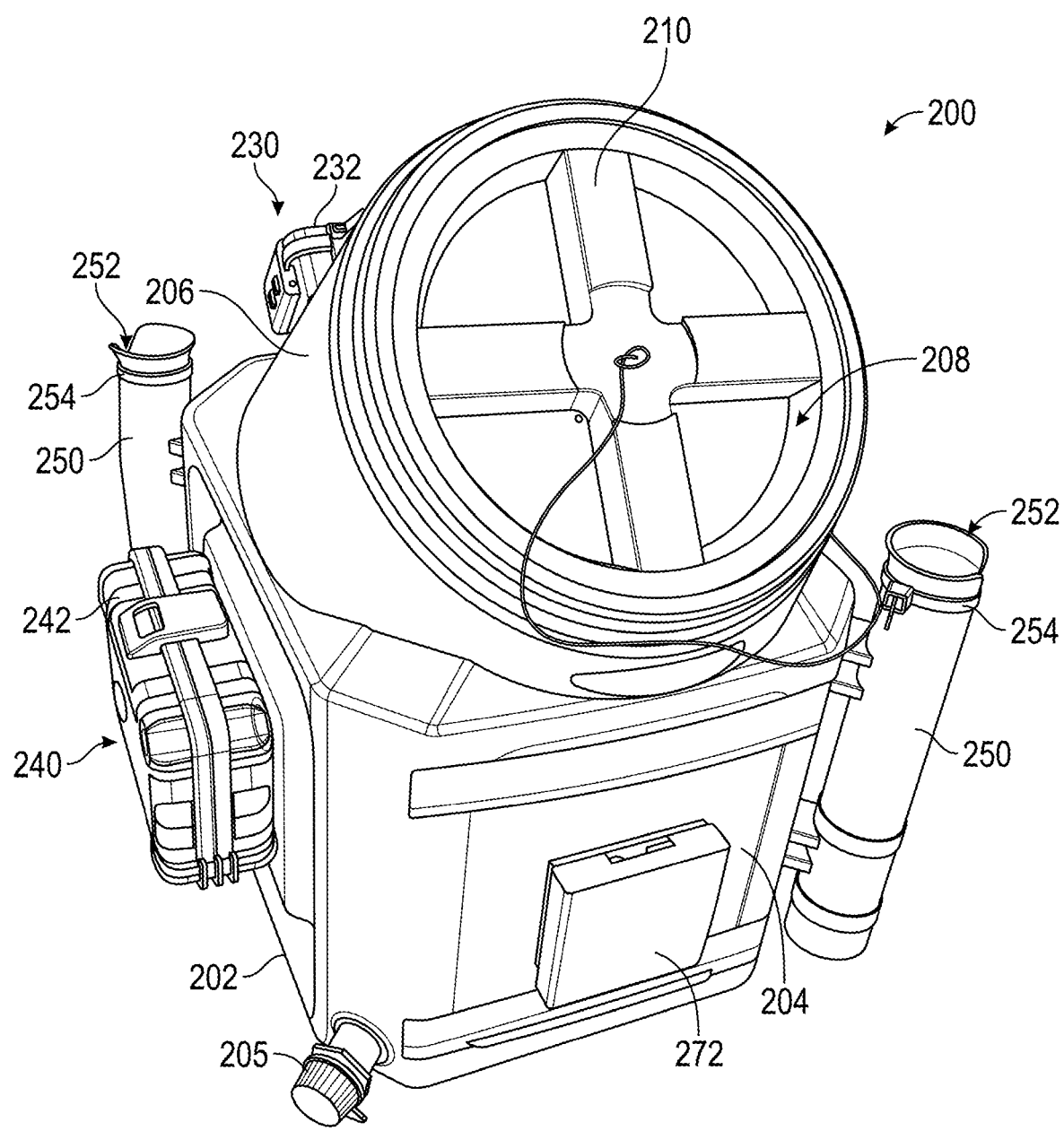
FIG. 14 is a perspective view of a livewell assembly, according to another exemplary embodiment.
Figure 15:
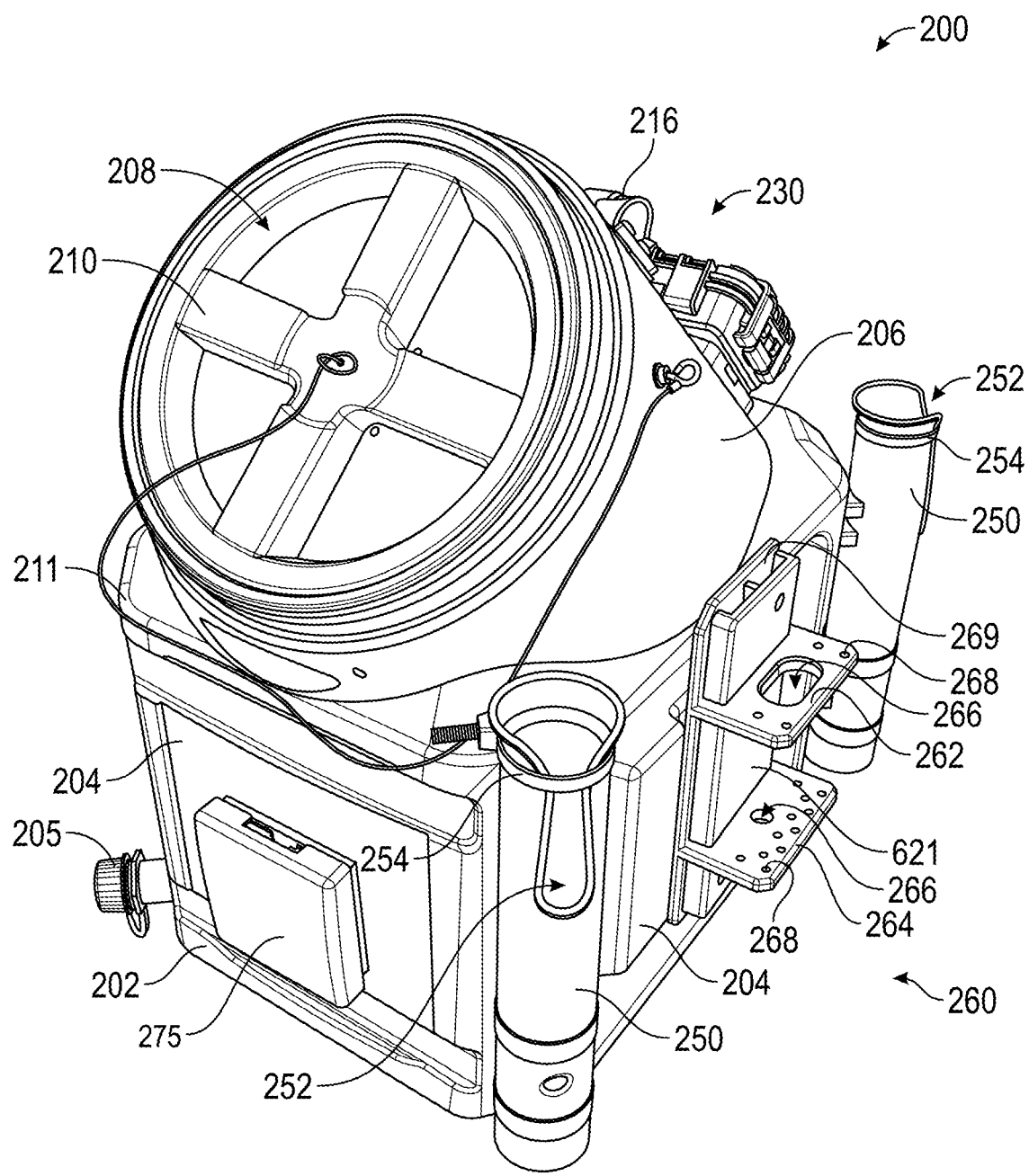
FIG. 15 is another perspective view of the livewell assembly of FIG. 14, according to an exemplary embodiment.
Figure 16:
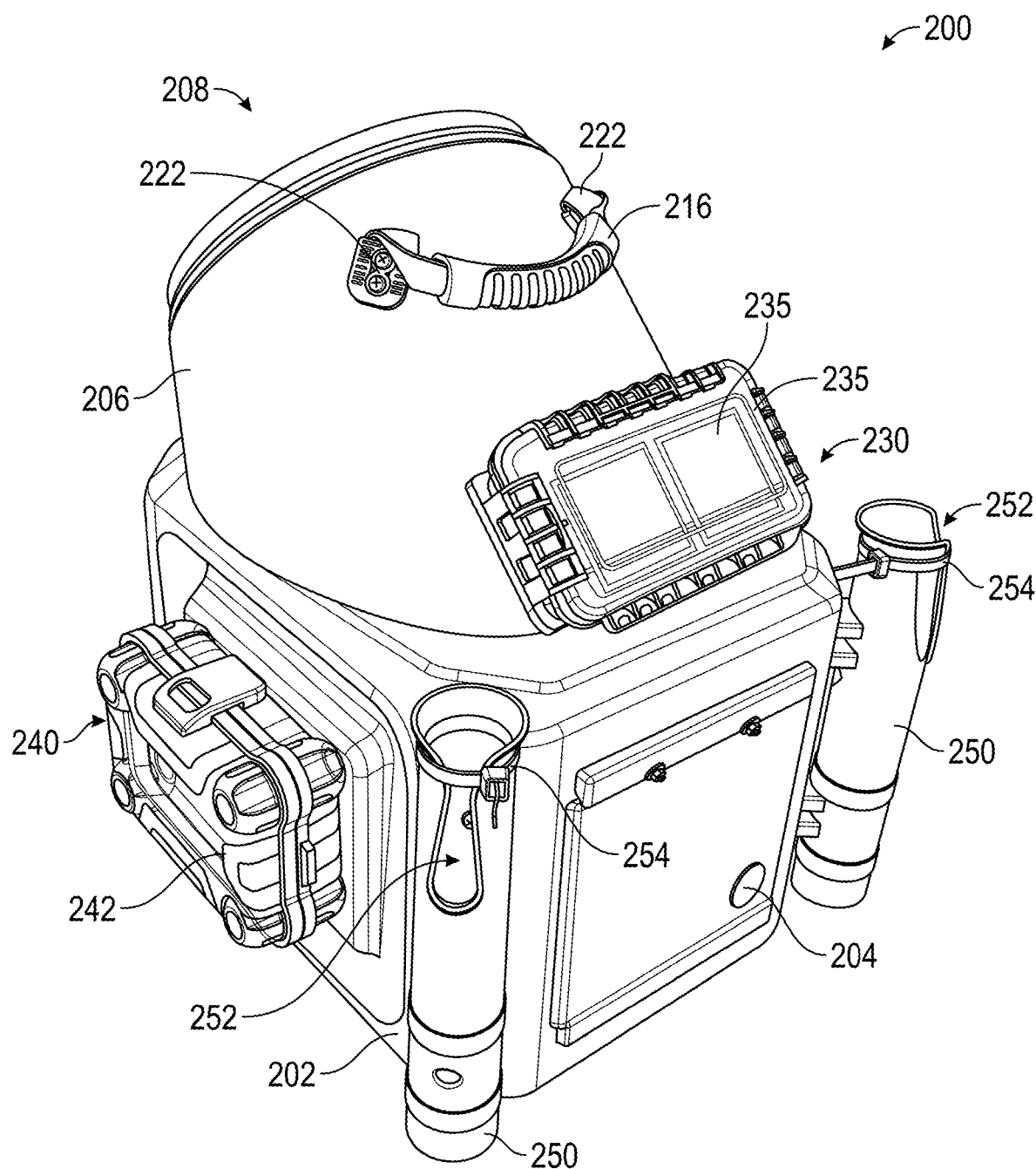
FIG. 16 is another perspective view of the livewell assembly of FIG. 14, according to an exemplary embodiment.

Referring now to FIGS. 14-16, a livewell assembly 200 is shown according to another embodiment. Livewell assembly 200 can be substantially similar to livewell assembly 100 and may include any element or feature described above with respect to livewell assembly 100. Similarly, livewell assembly 100 may include any or all of the features discussed below with respect to livewell assembly 200. For example, livewell assembly 200 may include an internal volume similar to internal volume 118. Additionally, bottom 102, wall 104 and top 106 may generally correspond to bottom 202, wall 204, and top 206. As shown in FIGS. 14-16, livewell assembly 200 includes a bottom 202, a wall 204, and a top 206. In an exemplary embodiment, a section of the wall 204 located near bottom 202 includes a drain 205. As shown in FIGS. 14-16, aperture 208 is angularly offset from bottom 202 and raised above the plane containing the base of top 206. Additionally, the aperture 208 is substantially offset from the centroid of internal volume 118 which may advantageously reduce negative effects of direct sunlight on aquatic life contained within the internal volume. Additionally, the angular offset and raised position of aperture 208 may further prevent aquatic life from departing the internal volume on its own volition. For example, aperture 208 is positioned away from the centroid of the internal volume which increases the amount of travel required by an aquatic life to pass through aperture 108. In some embodiments, lid 210 is tethered (e.g., tied, hitched, fastened, etc.) to top 206 by tether 211 to prevent the loss of lid 210 when lid 210 is disengaged from aperture 208.

As shown in FIG. 16, handle 216 is mounted to handle mount 222 by a plurality of screws. As shown, handle 216 includes a rigid or reinforced portion. In some embodiments, livewell assembly 200 may include at least one of handle 216 to facilitate ergonomic handling of the livewell assembly 200 by the user. As shown in FIGS. 14-16, livewell assembly 200 includes an exterior enclosure or container, shown as container 230 (e.g., a secondary housing). As shown, the container 230 is a dry-box and is configured to releasably secure at least one aerator 235.

As shown in FIGS. 14, and 16, the livewell assembly 200 includes an exterior compartment, shown as compartment 240 (e.g., a cavity, a storage space, etc.). As shown, compartment 240 is a dry-box and is configured to selectively seal and secure items within the compartment 240. In an exemplary embodiment, livewell assembly 200 includes a plurality of rod holders 250. In some embodiments, rod holder 250 includes an adjustable band 154 (e.g., collar) that allows the user to adjust the depth at which the handle of the fishing rod extends into rod holder 250. For example, rod holder 250 may have at least one of a zip tie, elastic band, strap, or worm hose clamp secured around an end of the rod holder 250 proximate top 206 that is configured to adjust the effective depth (e.g., length) of slot 252.

As shown in FIG. 15, the livewell assembly 200 includes a tool holder (e.g., holder, tool mount, etc.), shown as utility holder 260. As shown in FIG. 15, both top plate 262 and bottom plate 264 include a tool hole 266. In some embodiments, utility holder 260 includes a partitioned hollow slot 269 in the base 261 of the utility holder 260 that extends vertically when mounted to the livewell assembly 200. Hollow slot 269 may be configured to secure (e.g., sheath) at least one of a slender and elongated tool (e.g., a knife, a pair of scissors, etc.).

As shown in FIGS. 14 and 15, an accessory, shown as collapsible cup holder 272, is mounted to an exterior surface of wall 204. In other embodiments, one or more accessories may be releasably coupled to the livewell assembly 200 using a utility rail (e.g., a utility rail 170). In some embodiments, accessories may be mounted directly to wall 204 and may be fixedly coupled (e.g., bolted, fasted, glued, bonded, welded, etc.) to wall 204.

As shown in FIGS. 1-10 and 14-16, all or parts of livewell assembly 100 and livewell assembly 200 may be injection molded or include injection molded components. In some embodiments, livewell assembly 100 includes an injection molded bottom (e.g., bottom 102), that is sealed and fixed to an injection molded wall and top component (e.g., wall 104 and top 106). In an exemplary embodiment, bottom 102, wall 104, top 106, and lid 110 are made from a hydrophobic polymer that is suitable for marine applications (e.g., polyethylene, high-density polyethylene, etc.). In an exemplary embodiment, bottom 102, wall 104, and top 106 include an insulating material to reduce the heat transfer through the bottom 102, walls 104, and top 106. In some embodiments, bottom 102, wall 104, and top 106 are colored. In an exemplary embodiment, the bottom 102, wall 104, and top 106 use coloring that has an intrinsic low absorptivity and a high reflectivity (e.g., white) to reduce the amount of radiated energy (e.g., from the sun) absorbed by the bottom 102, wall 104, and top 106.

According to various embodiments, the livewells disclosed herein provide an easy-to-use fishing apparatus that facilitates use by a fisherman and avoids challenges faced by many other designs. For example, the sloped top (e.g., sloping toward a front of the livewell assembly) provides easy access to bait within the livewell assembly and sheds water (e.g., from rain, splashing, etc.) more easily than a flat top or other design. Any water that falls on the top surface of the livewell assembly is easily directed downward to the front, rear, and side surfaces. Water that may enter the front storage volume area can be drained via openings in the bottom of the storage volume. Similarly, water that may flow to the rod holders is able to escape via the open bottoms of the rod holders. In this way, a user may be provided with improved access to the livewell opening, rod holder, any accessories stored in the storage volume, and tools, tackle, etc. that are supported by a utility holder or other components, all from a front of the livewell assembly. At the same time that this single-sided access is maximized, any concern regarding damage from water (e.g., saltwater, rainwater, waves, etc.) is minimized due to the enhanced drainage and contouring features of the livewell assembly.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. For example, the accessory 272 of the exemplary embodiment described in FIGS. 14-16, may be incorporated in the livewell assembly 100 of the exemplary embodiment shown in FIGS. 1-10. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A livewell assembly, comprising:
    a main housing comprising a top opening and an interior accessible via the top opening, the interior configured to hold a volume of water and live bait;
    a circular cover removably coupled to the main housing and configured to close the top opening, wherein the circular cover is inclined toward a front portion of the livewell assembly, wherein a periphery of the circular cover comprises external threading configured to engage corresponding internal threading of the top opening, and wherein a top surface of the circular cover defines a plurality of pockets;
    a cutting board integrated with a bottom surface of the circular cover and defining a cutting surface, wherein the cutting surface is substantially planar and covers substantially all of the underside of the circular cover, wherein the cutting board is made of different material than the other surfaces of the circular cover;
    an aerator coupled to the main housing and configured to provide a flow of air to the interior while the circular cover is coupled to the main housing and closes the top opening;
    a utility rail coupled to an exterior of the main housing and configured to couple to an accessory, the utility rail being elongated and comprising a general C-shape cross-section;
    a second housing coupled to the main housing and configured to selectively hold the aerator, the second housing being water resistant;
    a rod holder coupled to the front portion of the main housing, wherein the rod holder is configured to selectively secure a fishing rod to the main housing;
    a utility rack coupled to the main housing, wherein the utility rack comprises an aperture configured to receive a portion of at least one of a tool and a fishing accessory, wherein a storage space is positioned between the utility rack and the interior; and
    a drain disposed within the main housing and configured to selectively drain the volume of water from the main housing;
    wherein a portion of a sidewall adjacent a bottom of the livewell assembly includes a plurality of markers configured to provide an indication of a length of an object.

2. The livewell assembly of claim 1, further comprising a second aerator selectively held by the second housing and configured to provide a second flow of air to the interior.

3. The livewell assembly of claim 1, wherein the rod holder comprises first and second rod holders positioned on opposite sides of the front portion of the main housing.

4. The livewell assembly of claim 3, wherein the storage space is a first storage space, and wherein the front portion of the main housing defines a second storage space positioned between the first and second rod holders, the second storage space configured to receive a storage container.

5. A livewell assembly, comprising:
    a main housing comprising a bottom, a top, a sidewall extending between the bottom and the top, a top opening disposed in the top, and an interior accessible via the top opening, wherein a bottom surface of the bottom defines a first plane;
    a cover removably coupled to the main housing and configured to close the top opening, wherein a top surface of the cover defines a second plane extending in a non-parallel fashion relative to the first plane such that the top opening is inclined toward a front surface of the sidewall, wherein a periphery of the cover comprises external threading configured to engage corresponding internal threading of the top opening, and wherein the top surface of the cover defines a plurality of pockets;
    a cutting board integrated with a bottom surface of the cover and defining a cutting surface, wherein the cutting surface is substantially planar and covers substantially all of the underside of the cover, wherein the cutting board is made of different material than the other surfaces of the cover;
    a first rod holder coupled to the front surface of the sidewall;
    a second rod holder coupled to the front surface of the sidewall;
    a compartment wall extending between the first rod holder and the second rod holder and defining a compartment volume between the front surface of the sidewall and the compartment wall;
    a utility rail coupled to an exterior of the main housing and configured to couple to an accessory, the utility rail being elongated and comprising a general C-shape cross-section;
    a second housing coupled to the main housing and configured to selectively contain an aerator coupled to the main housing, the second housing being water resistant;
    a drain disposed within the main housing and configured to selectively drain a volume of water from the main housing; and
    a utility rack coupled to the compartment wall, the utility rack comprising an extension extending outward relative to the front surface of the sidewall and comprising an aperture configured to receive a portion of at least one of a tool and a fishing accessory, wherein a storage space is positioned between the utility rack and the interior;
    wherein a portion of a sidewall adjacent a bottom of the livewell assembly includes a plurality of markers configured to provide an indication of a length of an object.

6. The livewell assembly of claim 5, wherein the utility rail is disposed in a recess in an exterior surface of the main housing, the recess extending longitudinally along the sidewall.

7. The livewell assembly of claim 5, wherein the second housing is disposed on an opposite side of the main housing from the front surface.

8. A livewell assembly, comprising:
    a main housing comprising a bottom, a top, a sidewall extending between the bottom and the top, a top opening disposed in the top, and an interior accessible via the top opening, wherein a bottom surface of the bottom defines a first plane;
    a circular cover removably coupled to the main housing and configured to close the top opening, wherein a top surface of the circular cover defines a second plane extending in a non-parallel fashion relative to the first plane such that the top opening is tilted toward a front surface of the sidewall, wherein the top surface of the circular cover defines a plurality of pockets, and wherein the circular cover comprises external threading configured to engage corresponding internal threading of the top opening;
    a cutting board integrated with a bottom surface of the circular cover and defining a cutting surface, the cutting surface being planar across substantially all of the bottom surface of the circular cover, wherein the cutting board is made of different material than the other surfaces of the circular cover;

an aerator coupled to the main housing and configured to provide a flow of air to the interior while the circular cover is coupled to the main housing and closes the top opening;

a utility rail coupled to an exterior of the main housing and configured to couple to an accessory, the utility rail being elongated and comprising a general C-shape cross-section;

a second housing coupled to the main housing and configured to selectively contain the aerator, the second housing being water resistant;

a pair of cylindrical bodies coupled to the front surface of the sidewall;

a compartment wall extending between the pair of cylindrical bodies and defining a compartment volume between the front surface of the sidewall and the compartment wall;

a utility rack coupled to a front surface of the compartment wall, the utility rack comprising an extension extending outward relative to the front surface of the compartment wall and comprising an aperture configured to receive a portion of at least one of a tool and a fishing accessory; and a storage area positioned between the utility rack and the interior and configured to hold a storage container;

wherein a portion of the sidewall adjacent a bottom of the livewell assembly includes a plurality of markers configured to provide an indication of a length of an object.

9. The livewell assembly of claim 8, further comprising an elongated recess extending along the main housing, the elongated recess configured to receive the utility rail for coupling one or more accessories to the main housing.

* * * * *